US006332680B1

(12) United States Patent
Ozawa

(10) Patent No.: US 6,332,680 B1
(45) Date of Patent: Dec. 25, 2001

(54) METHOD OF PRINTING SHEET-LIKE RECORDING MEDIUM AND PRINTER

(75) Inventor: Chizuo Ozawa, Nagano-ken (JP)

(73) Assignee: Mastermind Co., Ltd., Nagano-Ken (JP)

(*) Notice: Subject to any disclaimer, the term of this patent is extended or adjusted under 35 U.S.C. 154(b) by 0 days.

(21) Appl. No.: 08/836,386

(22) PCT Filed: Sep. 27, 1996

(86) PCT No.: PCT/JP96/02833

§ 371 Date: Jul. 1, 1997

§ 102(e) Date: Jul. 1, 1997

(87) PCT Pub. No.: WO97/11850

PCT Pub. Date: Apr. 3, 1997

(30) Foreign Application Priority Data

Sep. 29, 1995 (JP) .................................... 7-251713

(51) Int. Cl.[7] ................ B41J 2/01; B41J 3/407
(52) U.S. Cl. ........................... 347/104; 347/106
(58) Field of Search ................ 101/35, 37; 347/2, 347/106; 369/54, 44.32, 44.33, 58

(56) References Cited

U.S. PATENT DOCUMENTS

| 4,602,262 | * | 7/1986 | Milligan et al. ............... 347/130 |
| 4,873,680 | * | 10/1989 | Chung et al. .................. 369/59 |
| 5,216,442 | * | 6/1993 | Parks et al. . |
| 5,317,337 | * | 5/1994 | Ewaldt ........................ 347/2 |
| 5,335,594 | * | 8/1994 | Karlyn et al. ................. 101/35 |
| 5,481,970 | * | 1/1996 | Terzi et al. ................... 101/146 |
| 5,543,001 | * | 8/1996 | Casillo et al. ................. 156/60 |
| 5,573,831 | * | 11/1996 | Suzuki et al. ................. 428/64.1 |
| 5,636,199 | * | 6/1997 | Ariyoshi et al. .............. 369/191 |

FOREIGN PATENT DOCUMENTS

| 53-21604 | 2/1978 | (JP) . |
| 2-97326 | 8/1990 | (JP) . |
| 4-239672 | 8/1992 | (JP) . |
| 4-323040 | 11/1992 | (JP) . |
| 5-238005 | 9/1993 | (JP) . |
| 7-125500 | 5/1995 | (JP) . |

* cited by examiner

Primary Examiner—John Barlow
Assistant Examiner—M. Brooke
(74) Attorney, Agent, or Firm—Burns, Doane, Swecker & Mathis, L.L.P.

(57) ABSTRACT

A printing apparatus (1) has an ink-jet printer (2), a medium tray (4) for conveying a medium (3) to be printed by the printer (2), a medium feeding mechanism (5), and a medium retrieving mechanism (6). The printer (2) has an ink-jet printing head (21) and a tray conveyance mechanism for reciprocating the medium tray (4) along a predetermined conveyance path traversing the printing position of the printing head (21). A medium tray (4) carrying an unprinted medium (3) is placed on the medium feeding side of the printer (2), the medium tray (4) is conveyed past the printing position of the printing head (21), and the medium thereon is printed. The medium tray (4) is discharged to a medium tray discharge section (24). After removal of the medium (3), the medium tray (4) is returned to its original position. The medium tray (4) carrying the media (3) is reciprocated for repeated printing of the media (3). Printing of captions and the like on the surfaces of CD-Rs and other plate-like recording media can be readily conducted.

4 Claims, 8 Drawing Sheets

Fig. 2
(A)
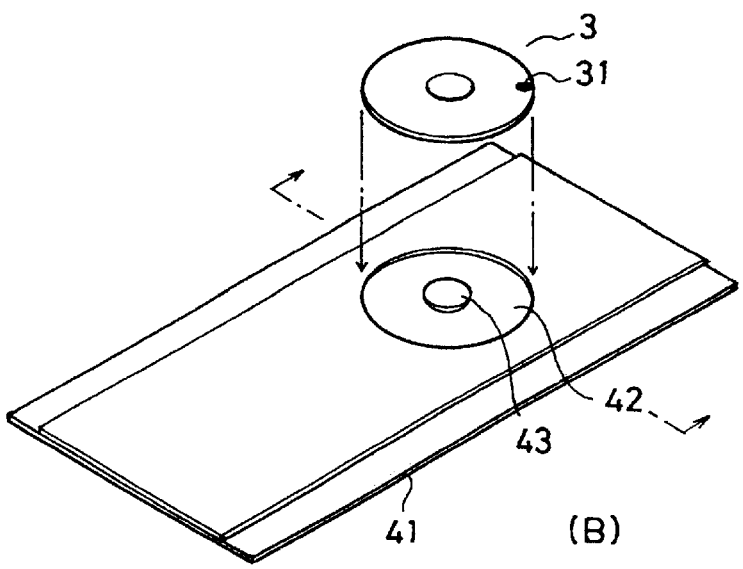
(B)
(C)
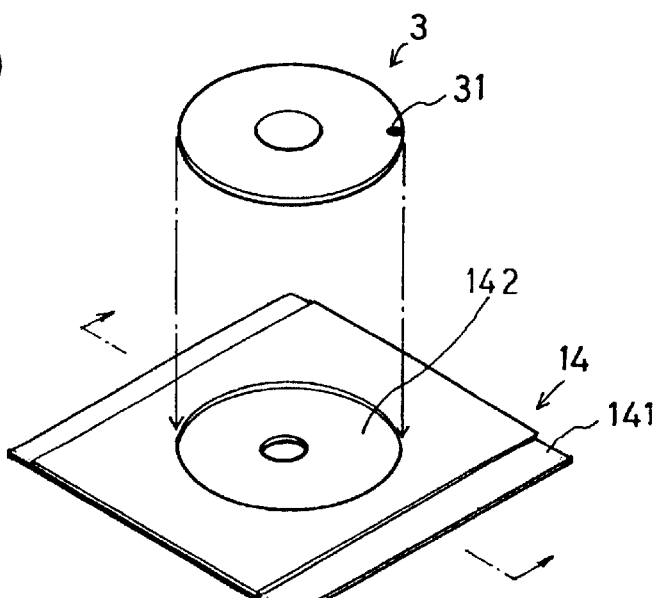
(D)
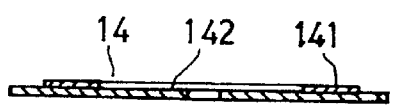

Fig. 3
(A)
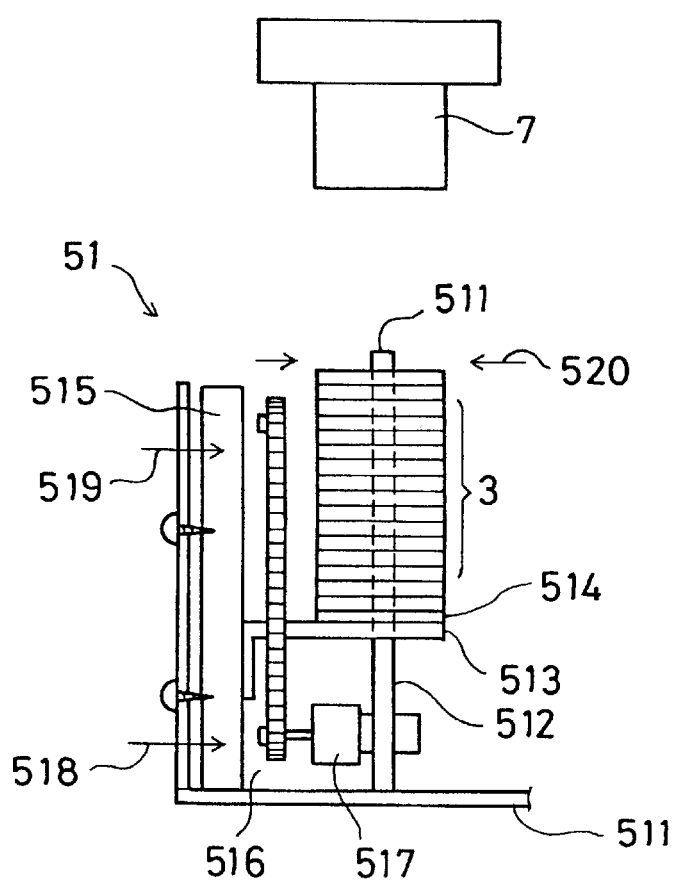
(B)
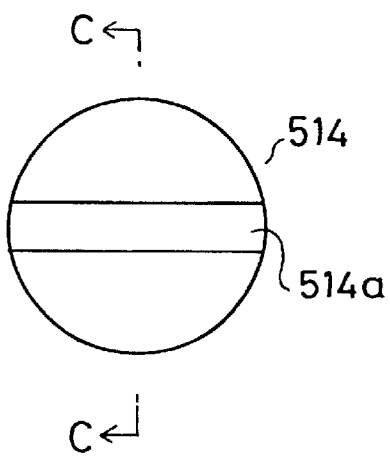
(C)
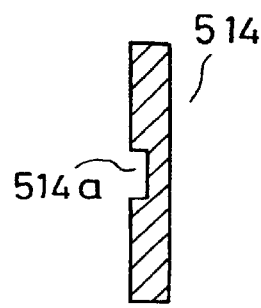

Fig. 5
(A)
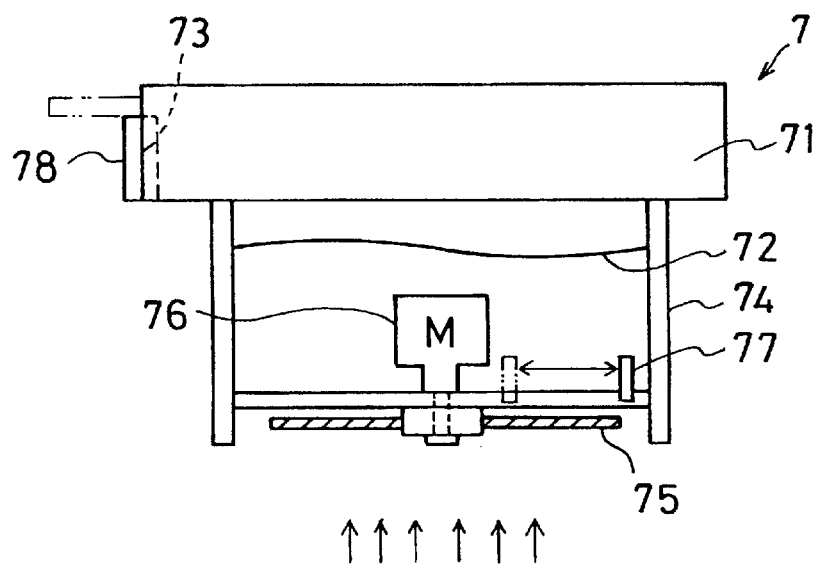
(B)
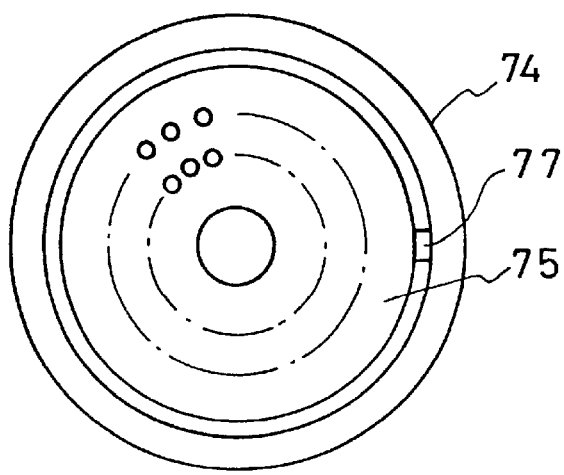

Fig. 8
(A)
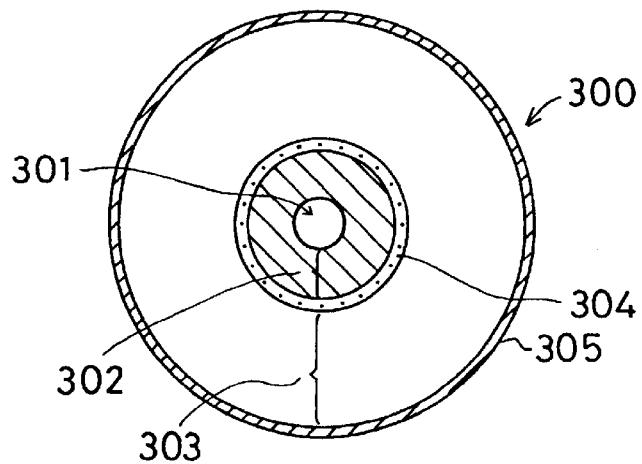
(B)
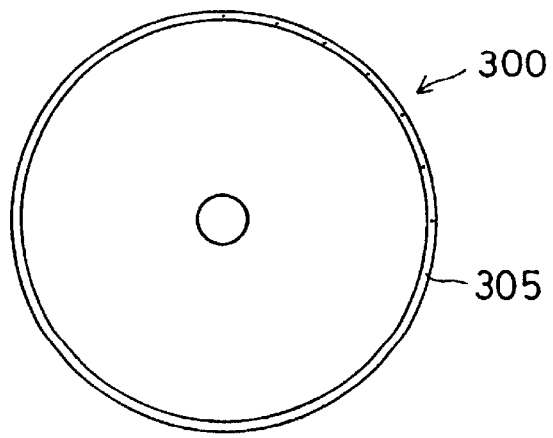

METHOD OF PRINTING SHEET-LIKE RECORDING MEDIUM AND PRINTER

TECHNICAL FIELD

This invention relates to a printing method and a printing apparatus for a printing plate-like recording medium, which are suitable for printing a caption, information or an image related to recorded content or the like on the surface of a compact disk per se, the surface of a case thereof, the surface of a case for a floppy disk, or the like (hereinafter collectively referred to as "plate-like recording media).

BACKGROUND ART

Plate-like recording media, e.g., CD-R and the like, are media which the user can utilize freely for recording. The surfaces of some media are printed in advance by another method with characters, designs, patterns and the like indicating company name, product name etc. that do not have to be changed with each recording of data. However, printing of additional information etc. is possible. Moreover, the recording capacity of such a medium is large. In view of these points, it is convenient to print titles and the like indicating the recorded content on the surface of the case or directly on the CD-R surface.

In the case of new record releases, computer software and other such products produced in large quantities and recorded with information known in advance, this kind of printing can be done by the manufacturer beforehand. However, no method or apparatus has ever been proposed for enabling the user to print desired content-related information, images and the like by a simple operation.

The object of this invention is to provide a printing method and printing apparatus enabling captions and the like to be easily printed on the surface of a CD-R or other plate-like recording medium or the surface of the case thereof.

DISCLOSURE OF THE INVENTION

For achieving the aforesaid object, this invention adopts a method having an ink-jet printing head and a medium tray for conveying a compact disk or other plate-like recording medium and conducting printing with the printing head of a caption or the like on the surface of the plate-like recording medium conveyed as carried on the medium tray. By placing the plate-like recording medium on the medium tray and conveying it to the printing position in this way, the printing of the plate-like recording medium can be conducted using an existing ink-jet printer substantially without modification.

The medium tray is preferably reciprocated within the printer along a conveyance path traversing the printing head. This is convenient because it enables printing to be conducted on the surfaces of a large number of plate-like recording media by loading unprinted media on the medium tray one at a time on one side and removing the printed plate-like recording media from the medium tray on the other side.

Although a printing head that uses dye ink can be employed, one using pigment ink can be used instead. Use of pigment ink enables formation of a durable printed surface since the film formed by the printing is not soluble in water.

When repeatedly printing disk-shaped recording media such as CD-Rs or when characters, designs, patterns and the like indicating company name, product name etc. that do not have to be changed with each recording of data are already printed by another method, the media must be oriented with respect to the medium tray when placed thereon. For this, an index can be formed on one or both of the plate-like recording medium and the medium tray to enable the plate-like recording medium to be placed in a prescribed positional relationship with respect to the medium tray and placing the recording medium on the medium tray based on the index.

When the plate-like recording medium is disk-shaped like a CD-R, for example, it suffices to form one or more indexes in the circumferential direction at one or more places on the outer edge or the center side.

Further, when it is possible to use an image reader or other such system and a sensor capable of discriminating a very small spot, the image pattern on the surface of the plate-like recording medium can be read in the circumferential direction and the plate-like recording medium be placed in the prescribed positional relationship with respect to the medium tray based on the read-out information.

The plate-like recording medium printing apparatus utilizing the invention method can comprise an ink-jet printing head, a medium tray for conveying a compact disk or other plate-like recording medium, a tray conveyance mechanism for reciprocating the medium tray within the printer along a conveyance path traversing the printing head, a feeding mechanism for feeding the unprinted plate-like recording medium to the medium tray, and a retrieving mechanism for retrieving the printed plate-like recording medium from the medium tray. This apparatus can, by its printing head, print a caption or the like on the surface of the plate-like recording medium conveyed as carried by the medium tray.

The feeding mechanism can be equipped with a medium carrier which conveys the unprinted plate-like recording medium along a prescribed conveyance path and places it on the medium tray. In this case, it is preferable to adopt a medium carrier equipped with a blower, an openable cover attached at an air outlet of the blower and a medium suction surface formed at an air intake of the blower.

In addition, the retrieving mechanism can be equipped with a medium carrier which retrieves the printed plate-like recording medium from the medium tray and conveys it along a prescribed conveyance path. This medium carrier can be equipped with a blower, a closable cover attached at an air outlet of the blower and a medium suction surface formed at an air intake of the blower.

When carriers of this configuration are used, operation of the blower enables the plate-like medium to be readily held by suction and conveyed to the desired location. After it reaches the desired position, the plate-like recording medium held by suction can be released and transferred to the desired spot by closing the air intake of the blower with the closable cover.

Preferably, the medium carriers further have a perforated turntable defining the medium suction surface, a rotational driver for rotating the turntable, and detection means, for detecting a positioning index formed on the plate-like recording medium, disposed at a position to be movable depending on the position of the index, rotation of the perforated turntable retaining the plate-like recording medium by suction being continued until the index is detected. By adopting this arrangement, the plate-like medium can be placed in a prescribed positional relationship with respect to the medium tray.

For continuously writing information to a large number of plate-like recording media and conducting printing on the surface thereof, the feeding mechanism of printing apparatus is preferably equipped with a medium storage section for storing unprinted plate-like recording media and a drive for conducting at least writing of information with respect to the plate-like recording media supplied from the medium storage section. In addition, the retrieving mechanism is preferably equipped with a reject retrieving section for retrieving rejects from among the plate-like recording media after writing and reading have been conducted in the drive.

On the other hand, when the reciprocating medium tray is not used, printing of plate-like recording media can be conducted using a printing apparatus of the following type. That is, there can be used a printing apparatus for printing plate-like recording media comprising a medium storage section for storing a vertical stack of separate trays having unprinted plate-like recording media set therein, a medium feeding mechanism configured to push out the separate trays having plate-like recording media set therein and stored in the medium storage section laterally from the lower end thereof one by one, a medium conveyance mechanism for receiving the separate trays having plate-like recording media set therein and pushed out by the medium feeding mechanism and conveying them along a prescribed conveyance path, an ink-jet printing head for conducting printing of captions and the like on the surface of the plate-like recording media conveyed along the prescribed conveyance path, a medium retrieving section for receiving the separate trays having printed plate-like recording media set therein at a lower end position and retrieving them as successively stacked in the vertical direction, and a medium discharge mechanism for receiving the separate trays having printed plate-like recording media set therein from the medium conveyance mechanism and transferring them to the medium retrieving section. When this method is used, printing can be conducted not only on plate-like recording medium but also on thick cardboard and the like.

BRIEF DESCRIPTION OF DRAWINGS

FIGS. 2(A) and 2(B) are explanatory diagrams showing an example of a reciprocating medium tray used in the apparatus of FIG. 1, and FIGS. 2(C) and 2(D) are explanatory diagrams showing an example of a separate medium tray used in the apparatus of FIG. 6.

FIGS. 3(A)–3(C) are explanatory diagrams showing the configuration of a medium feeding section used in the apparatus of FIG. 1, FIG. 3(A) being a schematic structural view, FIG. 3(B) a plan view of a circular bottom plate, and FIG. 3(C) a sectional view of the portion cut along line C—C.

FIGS. 5(A) and 5(B) are explanatory views showing the configuration of a medium carrier used in the apparatus of FIG. 1.

FIG. 8 is an explanatory view showing the position of an index affixed to a medium.

BEST MODE FOR CARRYING OUT THE INVENTION

Embodiments of the invention will be explained with reference to the drawings in the following.

First Embodiment

Overall Configuration

Figure 1:
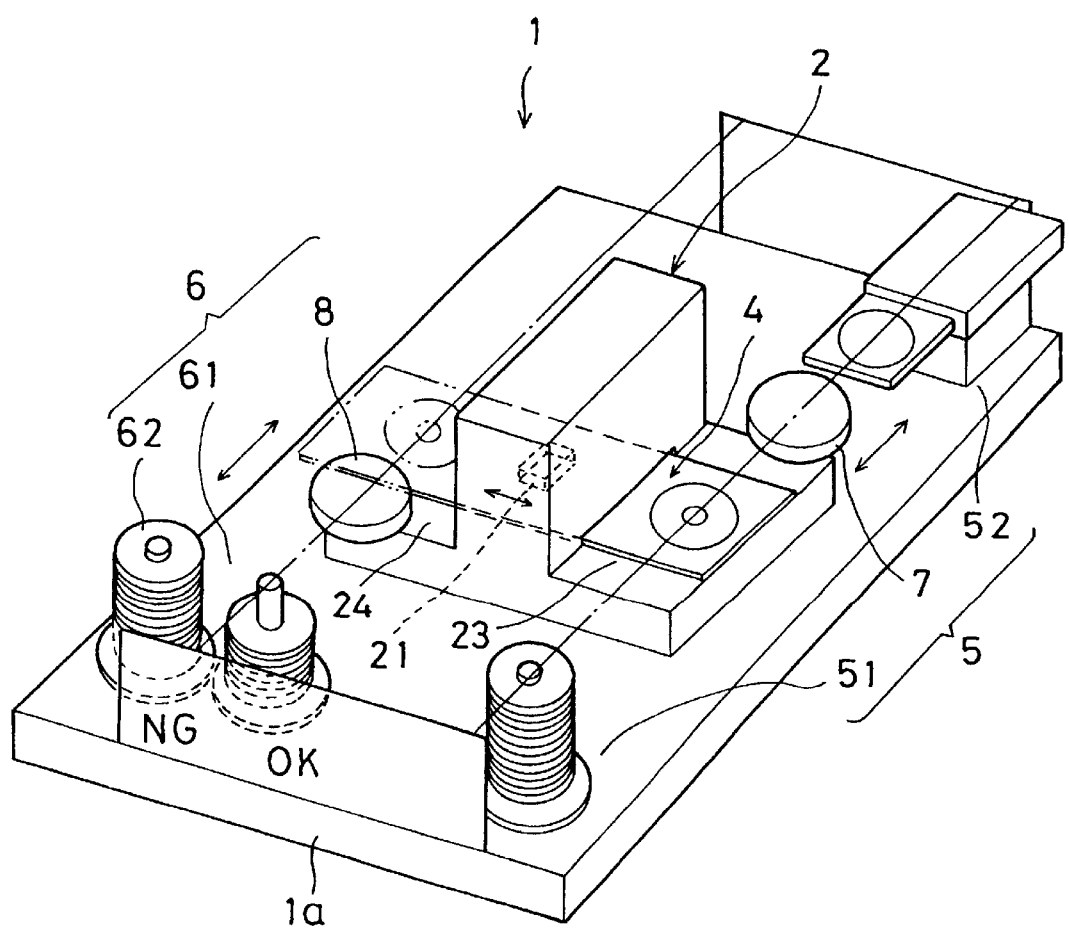
FIG. 1 is a schematic structural view showing the overall configuration of a printing apparatus which is a first embodiment of the invention.

FIG. 1 shows the overall configuration of a CD-R printing apparatus to which the invention has been applied. The printing apparatus 1 shown in the drawing has an ink-jet printer 2 mounted at the top center of an apparatus base 1a, a reciprocating medium tray 4 for conveying a CD-R (hereinafter referred to simply as a "medium") 3 to be printed by the ink-jet printer 2, a medium feeding mechanism 5 disposed on the side from which the unprinted medium is fed at the ink-jet printer 2, and a medium retrieving mechanism 6 disposed on the side from which the printed medium is discharged at the ink-jet printer 2.

The ink-jet printer 2 has an ink-jet printing head 21 and a tray conveyance mechanism (not shown) for reciprocating the medium tray 4 along a prescribed conveyance path traversing the printing position of the printing head 21. It suffices to adopt an ink-jet printer of a type in common use, without modification, as the ink-jet printer 2 and to adjust the spacing etc. between a tray guide member defining the printing position and the printing head to conduct printing on the surface of the medium conveyed on the medium tray 4. A detailed explanation of the structure of the printer itself is therefore not given in this specification.

The printing head 21 can be either one that conducts printing using dye ink or one that conducts printing using pigment ink. When durability against water and the like is required, it is preferable to employ a printing head using pigment ink.

The side of the ink-jet printer 2 in the foreground of the drawing is the medium feeding side, where a tray setting section 23 is formed for setting the reciprocating medium tray 4 carrying the unprinted medium 3. When the reciprocating medium tray 4 tray is set on the setting section 23 and the unshown tray conveyance mechanism is operated, the reciprocating medium tray 4 is fed laterally toward the printing head 21 and the surface of the unprinted medium 3 carried thereby is subjected to prescribed printing by the printing head 21. A discharge section 24 for the reciprocating medium tray 4 is formed on the medium discharge side of the ink-jet printer 2. The reciprocating medium tray 4 carrying the medium 3 printed by the printing head 21 is moved to the discharge section 24 after passing by the printing head 21.

The tray conveyance mechanism in this embodiment is configured to reciprocate the reciprocating medium tray 4. Such a reciprocating mechanism can be built using a prior-art drive mechanism. The reciprocating medium tray 4 thus passes from the tray setting section 23 past the printing head 21 printing position to the discharge section 24 and then returns via the printing position to the tray setting section 23 on the front side.

The configuration of the medium feeding mechanism 5 will now be explained. The medium feeding mechanism 5 has a medium storage section 51 for storing unprinted media 3 in a vertical stack, a drive 52 for conducting writing of preset information to the media 3 stored in the medium storage section 51, and a medium carrier 7 for conveying the media along a prescribed path. The medium storage section 51 and the drive 52 are disposed on opposite sides of the tray setting section 23 of the printer 2.

The medium carrier 7 conveys the medium 3 along the following path. The medium carrier 7 first conveys the uppermost medium 3 stacked in the medium storage section 51 toward the drive 52 and transfers it to the drive 52. After being recorded with information in the drive 52, the medium 3 is again conveyed by the medium carrier 7 and placed at a setting section 42 (see FIG. 2) of the reciprocating medium tray 4 resting on the tray setting section 23 of the ink-jet printer 2. The medium carrier 7 then goes to the medium storage section and stands by in a state enabling conveyance of the medium 3 processed by the drive.

On the other hand, the medium retrieving mechanism 6 is equipped with a medium retrieving section 61 for retrieving the printed media 3 other than rejects, a reject retrieving section 62 for retrieving rejects, and a medium carrier 8 for conveying the printed media 3 along a prescribed path. The medium retrieving section 61 and the reject retrieving section 62 are disposed on the same side of the discharge section 24 of the printer 2. It is also possible to dispose the retrieving sections 61, 62 on opposite sides of the discharge section 24 of the printer 2.

The structures of the individual components will now be explained.

Medium tray

FIGS. 2(A) and 2(B) show the reciprocating medium tray 4. As shown in the figure, the reciprocating medium tray 4 includes a tray body 41 consisting of a thin rectangular plate, a shallow circular recess 42 formed at an appropriate location in the tray body surface, and a circular projecting portion 43 formed at the center of the circular recess 42. The circular recess 42 is the setting section for the medium 3 and is given an internal diameter slightly larger than the diameter of the medium 3. The center projecting portion 43 is formed to a size for snug insertion in a center hole of the medium 3. The material of the tray body 41 can be plastic, thick cardboard or the like. Basically, however, any material is acceptable. The shape of the medium setting section 42 is not limited to that of a circular recess and any structure enabling the medium 3 to be set without shifting in any direction is usable.

Although the reciprocating medium tray 4 of this embodiment is of a two-layer structure, it can of course be integrally formed of synthetic resin or the like.

Medium storage section 51

FIG. 3 shows the general configuration of the medium storage section 51. The medium storage section 51 is provided with a base 511, a circular shaft-like pole 512 attached to the upper surface of the base 511, a lift plate 513 having the pole 512 passing therethrough, and a circular bottom plate 514 resting on the lift plate 513 and having the pole 512 passing through the center thereof. Media 3 are fitted from above onto the portion of the pole 512 projecting from the circular bottom plate 514 to be stored in a stack.

The lift plate 513 ascends and descends freely along a slide rail 515 attached to stand upright on the base 511. It is raised and lowered by a gear motor 517 via a transmission mechanism 516 comprising a timing belt and pulleys. The range of vertical movement of the lift plate 513 is defined by a lower limit sensor 518 and an upper limit sensor 519 mounted on the slide rail 515.

In addition, a media sensor 520 is disposed laterally of the upper end of the pole 512 for use in the operation of lifting the next medium when the preceding one has been sucked upward onto the carrier, thereby constantly conveying the position of the media to a fixed location, and for, when no more media 3 are left in medium storage section 51, detecting this fact. Specifically, as shown in FIG. 3(B), the upper surface of the circular bottom plate 514 is formed with a diametrical groove 514a and the groove is aligned with the path of the media sensor 520 detection light. When a medium 3 is carried on the bottom plate 514, its presence can be detected since medium 3 reflects the sensor 520 detection light. When no medium 3 is left on the bottom plate 514 and the bottom plate 514 rises to the height of the media sensor 520, the detection light beam passes through the groove 514a and no reflected light can be obtained. As a result, the fact that no media 3 remain is detected.

Medium retrieving section 61

Figure 4:
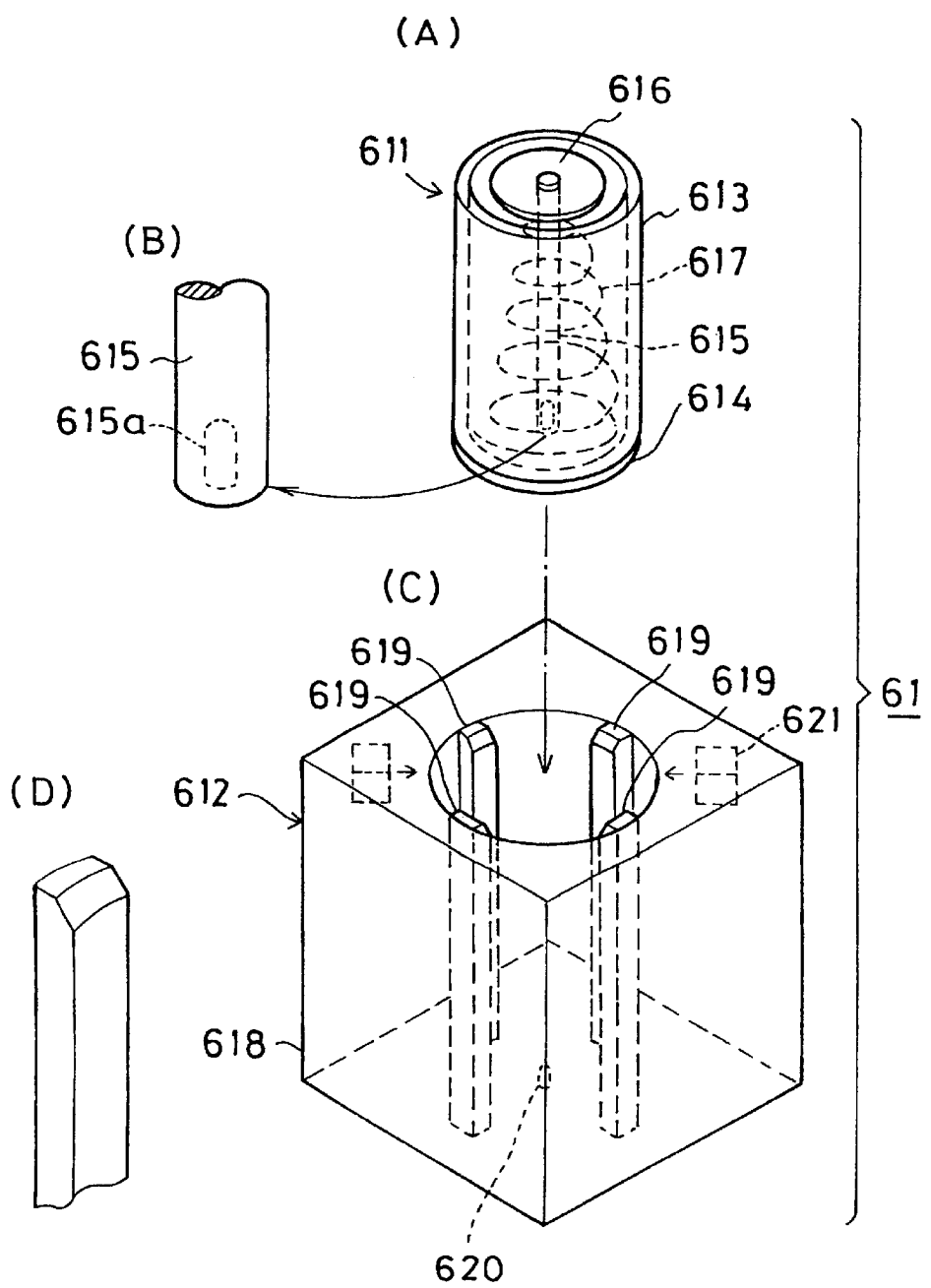
FIGS. 4(A)–4(D) are explanatory diagrams showing the configuration of a medium retrieving section used in the apparatus of FIG. 1, FIG. 4(A) being a structural diagram of a medium storage cylinder, FIG. 4(B) an explanatory view showing a positioning hole at the lower end of a pole thereof, FIG. 4(C) a structural diagram of an outer case, and FIG. (D) an explanatory view showing the upper portion of a cylinder guide.

The configuration of the medium retrieving section 61 is shown in FIG. 4. The medium retrieving section 61 comprises a cartridge type medium storage cylinder 611 made of acrylic resin sheet or other such transparent synthetic resin material and an outer case 612 for removably accommodating the medium storage cylinder 611. The medium storage cylinder 611 includes a transparent circular cylinder 613 made of acrylic resin sheet or other such transparent synthetic resin material, which has a floor plate 614 attached to it bottom. A pole 615 extends from the center of the floor plate along the central axis of the cylinder. A floating plate 616 formed at its center with a pole through-hole is fit onto the upper end of the pole 615. The floating plate 616 rests on a conical coil spring 617 disposed around the pole. Each time a medium 3 is loaded on the floating plate 616, therefore, the floating plate 616 moves down owing to compression of the conical coil spring 617 by the added weight.

The lower end surface of the pole 615 passes through the floor plate 614 to be exposed at the undersurface of the floor plate 614. As shown in FIG. 4(B), this lower end surface is formed with a positioning hole 615a.

The outer case 612 in the medium storage cylinder 611 of this configuration is removably accommodated comprises a rectangular frame 618 wherein a plurality of (four, for example) cylinder guides 619 having tapered upper ends are concentrically disposed. The medium storage cylinder 611 can be removably inserted into the space defined by the cylinder guides 619 from above. The floor of the outer case 612 is disposed at the center thereof with a positioning stud 620 insertable into the positioning hole 615a opening at the lower end surface of the pole of the medium storage cylinder 611. A full-state detection sensor 621 is disposed at the upper end of the outer case 612 for detecting when the medium storage cylinder 611 is filled with media 3.

With the medium retrieving section 61 of this configuration, when the medium storage cylinder 611 becomes full of media 3, it can be removed from the outer case 612 to collect the media 3 cylinder by cylinder. An empty cylinder can be inserted after the full cylinder has been removed. After collection, the full cylinder can be taken to another location for the next processing step. Owing to the provision of the positioning stud 620 and the cylinder guides 619, the medium storage cylinder 611 is automatically positioned even when inserted from above without particular caution. The insertion operation is therefore easy to conduct.

The reject retrieving section 62 is identically configured.

(Medium carrier 7)

FIG. 5 shows the configuration of the medium carrier 7. The medium carrier 7 is constituted utilizing a blower of a type in common use. Specifically, the medium carrier 7 is equipped with a blower unit 71 having an internal propeller, an air intake 72 opened in a casing of the blower unit 71, and an air outlet 73 also opened in the casing.

A circular cylinder 74 is attached to the air intake 72. A turntable 75 is disposed in the circular open end of the cylinder 74 concentrically therewith. The turntable 75 is coupled with the output shaft of a motor 76 disposed inside the cylinder 74. An optical sensor 77 is attached at a location enabling it to move from the outer edge of the turntable 75 at the inner surface of the cylinder 74 toward the inner edge thereof. The optical sensor 77 detects the side of the medium 3 sucked onto the turntable 75 through the gap between the outer edge of the turntable 75 and the inner surface of the cylinder 74 and through the transparent turntable.

On the other hand, a closable cover 78 is attached at the air outlet 73 for opening and closing it. When the closable cover 78 is open, the medium carrier 7 functions, sucking air in through the air intake 72 and discharging from the air outlet 73. Therefore, if the turntable 75 attached at the air intake 72 of the medium carrier 7 is contacted with or brought near the surface of a medium 3, the medium 3 will be sucked onto the turntable 75 by the air suction force. Conversely, if the air outlet 73 is closed by the closable cover 78, the air intake action is inhibited and the medium 3 sucked onto the turntable 75 falls off.

It therefore suffices to move the so-configured medium carrier 7 along a prescribed conveyance path (represented by a thick line in FIG. 1) and to arrange for the medium 3 and the turntable 75 to oppose each other concentrically at each position. By this, the unprinted media 3 stored in the medium storage section 51 can be sucked one by one, conveyed to the drive 52 side, and placed precisely with respect to the medium setting section 52a of the drive 52. Further, the recorded media 3 received at the drive 52 can be placed precisely with respect to the media setting section 42 of the reciprocating medium tray 4 of the printer 2.

In this embodiment, the medium carrier 7 is equipped with the sensor 77 as mentioned earlier. An index for detection by this sensor is formed on each medium 3. Specifically, one positioning index 31 is formed in the circumferential direction on or near the outer edge or the inner edge of the medium 3 (see FIG. 2). This index may be printed or be formed by cutting away a portion of the medium 3. In either case, the position of the index 31 in the radial direction is defined to be a position enabling detection by the optical sensor 77.

After the medium carrier 7 has received the medium 3 from the drive 52, for example, the motor 76 is operated to rotate the turntable 75 holding the medium 3 by suction until the index 31 affixed to the medium 3 is detected. The turntable 75 is stopped at the rotational position where the optical sensor 77 detects the index. If the media 3 are placed on the setting section 42 of the medium tray 4 while maintained in this state, they can always be placed on the medium tray 4 in the same orientation.

Advantages are therefore obtained, including that when, for example, a single medium 3 is overprinted a number of times, or when the medium 3 has be been printed beforehand, at each printing the printing can be conducted with the medium 3 aligned in a fixed orientation.

(Modifications of the first embodiment)

In this embodiment, the turntable 75 is attached to the medium carrier 7 and the medium 3 is held thereon by suction. When positioning of the medium 3 is unnecessary, however, the turntable and the sensor can be omitted and the medium 3 be sucked onto the annular end surface of the cylinder 74 attached to the air intake.

Moreover, the medium carrier 7 need not be of the suction conveying type as in this embodiment but, for example, can instead be one with a mechanism for carrying the medium 3 by gripping it from above and below. Alternatively, it is possible to adopt one with a mechanism for carrying the medium by inserting openable claws into the hole at the center of the medium or a mechanism for grasping the outer periphery of the medium.

In this embodiment, the medium 3 is formed with the index 31 to enable detection of the rotational angular position of the medium 3. Instead, it is possible, for example, to install an image reader, read the surface of the medium 3 in the circumferential direction and store the read-out image pattern in a memory beforehand, and determine the rotational angular position of the medium 3 based on the stored information.

Although this embodiment of the printing apparatus 1 is equipped with the drive 52, in a case where information is not written to the medium 3 and only printing of its surface is conducted, the drive 52 is unnecessary. Further, installation of the reject retrieving section 62 is also unnecessary when the elimination of rejects is conducted manually or when the drive is not provided.

In addition, the medium feeding mechanism 5 and the medium retrieving mechanism 6 can be omitted. In this case, the setting of the media with respect to the reciprocating medium tray 4 on one side of the printer 2 can be conducted manually and the removal of the printed medium from the other side also be conducted manually.

The position at which index 31 is formed will now be explained. As shown in FIG. 8(A) a CD-R 300, for example, has at its center a chucking section 302 with a center hole 301 and is formed outward thereof with a portion formed on the front and rear sides with annular recording surfaces 303. Since the rear surface of the chucking section is not applied with a coating for printing, it is an unrecordable portion. In addition, a thin ring-like portion 304 that cannot be printed by the ink-jet method is formed between the chucking section 302 and the recording surface 303. At the outer edge 305 is a transparent rim.

A marking can therefore be printed on the surface of the central chucking section 302 by silk-screen printing in advance for use as an index. Otherwise, this portion can be printed with data using dots or a large number of lines. As shown in FIG. 8(B), it also of course possible to form the index at the transparent outer edge 305 portion or, by silk-screen printing, to print this portion in the circumferential direction beforehand with data in the form of dots or line segments. The recording surface 303 can be printed by either silk-screen or ink-jet printing.

(Second Embodiment)

Another embodiment of the invention will now be explained with reference to FIG. 6. The printing apparatus 10 of this embodiment conveys media using a separate medium tray for each medium and prints them with an ink-jet printing head. (The separate medium trays are unnecessary when handling media contained in hard cases.)

As shown in FIGS. 2(C) and 2(D), the separate tray 14 used in this embodiment includes a tray body 141 consisting of a thin rectangular plate and a shallow circular recess 142 formed at the center of the tray body surface. The circular recess 142 is the setting section for the medium 3 and is given an internal diameter for snug accommodation of the medium 3. The center of the circular recess 142 is formed with a through-hole for receiving the projecting portion at the center portion of the medium 3. The material of the tray body 141 can be plastic, thick cardboard or the like. Basically, however, any material is acceptable. The shape of the medium setting section is not limited to that of a circular recess and any structure enabling the medium 3 to be set without shifting in any direction is usable.

Figure 6:
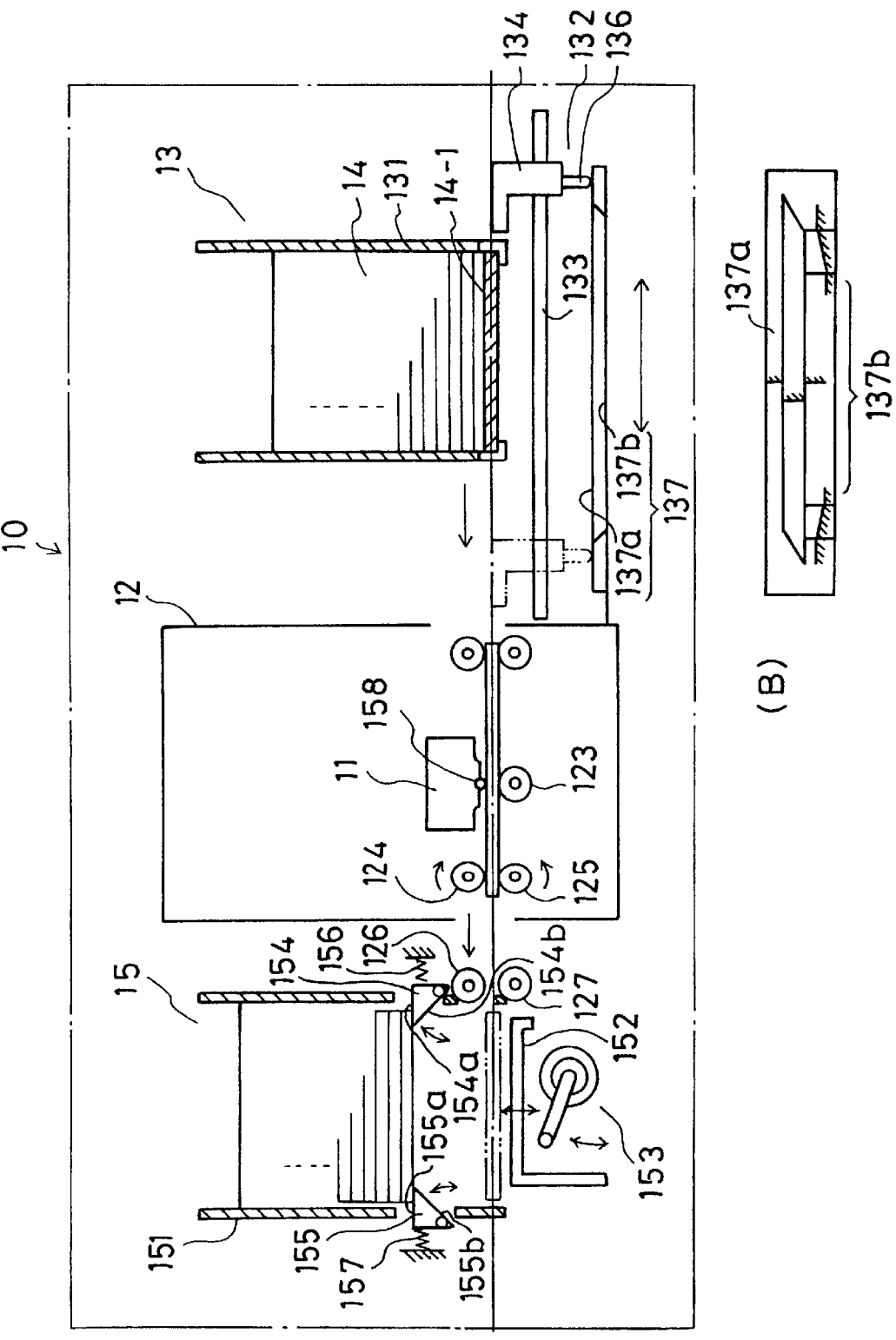
FIG. 6 is a schematic structural view showing the overall configuration of a printing apparatus that is a second embodiment of the invention.

The explanation will now be continued with reference to FIG. 6. The printing apparatus 10 of this embodiment is basically constituted of a centrally located printer 12 equipped with an ink-jet printing head 11, a medium feeding section 13 disposed on one side of the ink-jet printer 12, and a medium retrieving section 15 disposed on the other side of the printer 12.

The medium feeding section 13 is equipped with a stacker 131 for storing a vertical stack of separate trays 14 having CD-Rs or other plate-like media set therein and a forwarding mechanism 132 for laterally forwarding toward the printer 12 the medium-carrying separate tray 14 that is at the bottommost position in the stacker 131. This forwarding mechanism 132 is equipped with a pusher head 134 capable of reciprocating laterally along a lateral guide 133 and a drive mechanism for moving the head 134. The drive mechanism can be a conventional mechanism for converting the rotational force of a motor into linear movement. A cam pin 136 is attached to the lower end of the head 134. As shown in FIG. 6(B), the cam surface 137 on which the cam pin 136 slides has a high cam surface 137a on which the cam pin 136 slides during feed-out operation and a low cam surface 137b on which the cam pin 136 slides during return operation.

By making the width of the head 134 narrower than the bottom width of the stacker 131, therefore, the medium-carrying separate tray 14 supported by the lower ends of the opposite walls of the stacker 131 can, during advance of the head 134, be hit by the head 134 and forwarded to the printer 12. During return of the head 134, however, since the head 134 returns at a level that is one step lower, it can return to its initial position under the stacker 131 without hitting the medium-carrying separate tray 14 now at the lower end of the stacker 131. By reciprocating the head 134, therefore, the medium-carrying separate trays 14 can be forwarded one at a time to the printer 12 from the lower end of the stacker 131.

The printer 12 is formed with a lateral medium conveyance path at substantially the same height as that of the forwarded medium-carrying separate trays 14. For receiving the forwarded medium-carrying separate trays 14, this medium conveyance path is basically constituted by a platen roller 123 facing the printing head 11 across a fixed gap, a spring 158 for pressing the separate tray 14 onto the platen roller 123, and a pair of discharge rollers 124, 125 disposed downstream of the printing head 11 in the direction of conveyance.

A separate tray 14 having a medium set therein laterally forwarded from the medium feeding section 13 is caught between the platen roller 123 and the spring 158 and conveyed toward the printing head 11 by these members. The printing head 11 conducts prescribed printing of the medium surface synchronously with the conveyance of the separate tray 14. The medium-carrying separate tray 14 is then discharged from the printer 12 by the discharge rollers 124, 125. The separate tray 14 carrying the printed medium is forwarded to the medium retrieving section 15 by feed rollers 126, 127.

The medium retrieving section 15 is equipped with a stacker 151 for retrieving the medium-carrying separate trays 14 as stacked in the vertical direction, a lift plate 152 defining the floor of the stacker 151, and a lift mechanism 153 for raising and lowering the lift plate 152. The lift mechanism 153 pushes the lift plate 152 upward by rotating a lever fixed to the shaft of a gear motor and having a roller at its distal end.

Inwardly projecting pawls 154, 155 are disposed at opposite inner surfaces of the stacker 151. The pawls 154, 155 can rotate about their lower ends between a state in which their upper portions project inward and a state in which they are completely retracted to the outside. In addition, the pawls 154, 155 are biased in the projecting direction from behind by springs 156, 157. In the projected state of the pawls 154, 155, their upper sides form substantially horizontal medium support surfaces 154a, 155a, while their lower side portions form inclined surfaces 154b, 155b which slope inward in the upward direction.

The feed rollers 126, 127 convey the separate tray 14 carrying a printed medium to directly under the stacker 151 of the medium retrieving section 15. When the medium-carrying separate tray 14 reaches this position, the lift mechanism 153 is driven to move the lift plate 152 upward. The medium-carrying separate tray 14 is raised by the lift plate 152. Although the pawls 154, 155 project from the inner surfaces of the stacker, the forced lifting of the medium-carrying separate tray 14 along the inclined surfaces 154b, 155b on the lower sides of the pawls retracts the pawls 154, 155 outwardly against the forces of the springs 156, 157. When the medium-carrying separate tray 14 has been lifted past the pawls, the lift plate 152 is lowered. The medium-carrying separate tray 14 is then supported on the medium support surfaces 154a, 155a on the upper sides of the pair of pawls 154, 155 which now project inward. In this way, the separate trays 14 carrying printed media forwarded from the printer are successively stacked in the stacker 151 from below.

(Other Embodiment)

Figure 7:
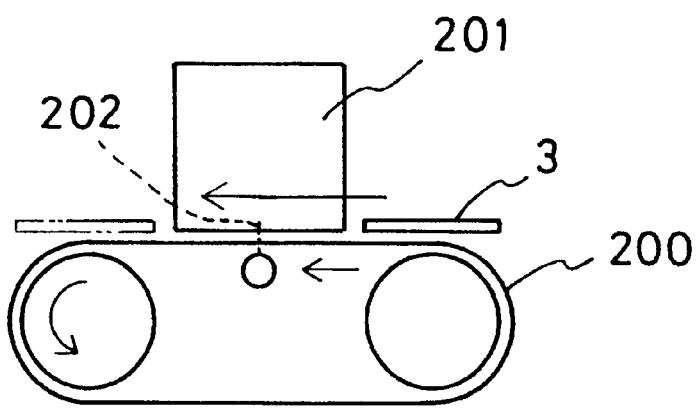
FIG. 7 is a schematic structural view showing another example of a medium conveyance mechanism.

An example of a medium conveyance method differing from those of FIGS. 1 and 6 will be explained. In the foregoing embodiments, the medium 3 is conveyed using a tray. Instead, as shown in FIG. 7, a conveyor belt 200 can be disposed to circulate via the printing position 202 within a printer 201 and the medium can be conveyed by the conveyor belt 200. In this case, the surface of the conveyor belt can be formed with one or more shallow recesses and the media be placed therein (this recess being similar to that formed in the medium tray explained earlier).

Industrial Applicability

As explained in the foregoing, in the method and printing apparatus for printing plate-like recording media of this invention, an ink-jet printing head and a medium tray for conveying a compact disk or other plate-like recording medium are provided and printing is conducted with the printing head of a caption or the like on the surface of the plate-like recording medium conveyed as carried on the medium tray. Therefore, by placing the plate-like recording medium to be printed on the medium tray and conveying it to the printing position in this way, the printing of the plate-like recording medium can be conducted using an existing ink-jet printer substantially without modification.

The medium tray is reciprocated within the printer along a conveyance path traversing the printing head. This is convenient because it enables printing to be conducted on the surfaces of a large number of plate-like recording media by loading unprinted media on the medium tray one at a time on one side of the medium tray conveyance path and removing the printed plate-like recording media from the medium tray on the other side.

In this invention, an index is formed on one or both of the plate-like recording medium and the medium tray to enable the plate-like recording medium to be placed in a prescribed positional relationship with respect to the medium tray. Therefore, the position of the plate-like recording medium with respect to the medium tray can be easily conducted based on the index.

Moreover, in this invention, a medium carrier for conveying the plate-like medium is equipped with a blower, an openable cover attached at an air outlet of the blower and a medium suction surface formed at an air intake of the blower. The medium conveyor of this configuration enables the plate-like recording medium to be reliably conveyed with a simple structure.

The invention thus enables desired printing of the surface of a CD-R or other plate-like recording medium to be conducted with ease.

What is claimed is:

1. A printing apparatus for printing plate-like recording media, the printing apparatus comprising:

an ink-jet printer, a reciprocating medium tray for conveying a plate-like recording medium to be printed by the ink-jet printer, a medium feeding mechanism disposed on one side of the ink-jet printer from which a plate-like recording medium is fed to the ink-jet printer before printing, and a medium retrieving mechanism disposed on another side of the ink-jet printer from which the plate-like recording medium is discharged from the ink-jet printer after printing;

the ink-jet printer has an ink-jet printing head, a tray setting section for supporting the reciprocating medium tray carrying the unprinted plate-like recording medium, a tray discharge section for discharging the reciprocating medium tray carrying the printed plate-like medium, and a tray conveyance mechanism for reciprocating the reciprocating medium tray along a straight conveyance path traversing a printing position of the ink-jet printing head, the straight conveyance path being formed between the tray setting section and the tray discharge section;

the medium feeding mechanism has a medium storage section for storing a plurality of unprinted plate-like recording medium, and a medium carrier which conveys the unprinted plate-like recording medium stacked in the medium storage section, transfers it along a straight conveyance path to the reciprocating medium tray resting on the tray setting section of the ink-jet printer, and places it thereon;

the medium retrieving mechanism has a medium retrieving section for retrieving the plate-like recording medium after printing, and a medium carrier which carries the plate-like recording medium from the reciprocating medium tray located at the tray discharge section of the ink-jet printer, transfers it along a straight conveyance path to the medium retrieving section, and places it thereon;

each of said medium carriers has a blower, an openable cover attached at an air outlet of the blower, a cylinder defining an air intake of the blower, a perforated transparent turntable defining a medium suction surface and disposed in a circular open end of the cylinder, a rotational driver for rotating the transparent turntable, and detection means for detecting through the transparent turntable whether or not a plate-like recording medium is sucked onto the transparent turntable; and the detection means also detects through the transparent turntable a positioning index formed on the plate-like recording medium, and the detection means is movable from an outer edge of the transparent turntable toward an inner edge thereof depending on a position of the positioning index, and the perforated transparent turntable retaining the plate-like recording medium by suction being rotated until the positioning index is detected by the detection means.

2. The printing apparatus according to claim 1, wherein the medium retrieving mechanism is equipped with a reject retrieving section for retrieving rejects from among the plate-like recording media after printing.

3. The printing apparatus according to claim 1, wherein the printing head conducts printing using at least one of dye ink and pigment ink.

4. The printing apparatus according to claim 1, wherein the conveyance paths of the medium carriers extend in a horizontal direction and the horizontal direction of each of the conveyance paths are parallel with each other and are perpendicular to the conveyance path of the reciprocation medium tray.

* * * * *